(12) United States Patent
Kobayashi (10) Patent No.: US 7,675,824 B2
(45) Date of Patent: Mar. 9, 2010

(54) OPTICAL DISC APPARATUS

(75) Inventor: Toshikazu Kobayashi, Tokyo (JP)

(73) Assignee: Sony Computer Entertainment Inc., Tokyo (JP)

( * ) Notice: Subject to any disclaimer, the term of this patent is extended or adjusted under 35 U.S.C. 154(b) by 780 days.

(21) Appl. No.: 11/488,898

(22) Filed: Jul. 18, 2006

(65) Prior Publication Data

US 2007/0019516 A1    Jan. 25, 2007

(30) Foreign Application Priority Data

Jul. 19, 2005  (JP) .............................. 2005-209257

(51) Int. Cl.
  *G11B 7/00*   (2006.01)
  *G11B 7/125*  (2006.01)
  *G11B 5/55*   (2006.01)
(52) U.S. Cl. ................................. 369/44.27; 369/53.28
(58) Field of Classification Search .............. 369/44.27, 369/43
See application file for complete search history.

(56) References Cited

U.S. PATENT DOCUMENTS

2002/0031072 A1* 3/2002 Kamiyama et al. ....... 369/53.23
2002/0136103 A1* 9/2002 Kobayashi ................... 369/43
2005/0105410 A1* 5/2005 Kitano et al. ............ 369/44.27

FOREIGN PATENT DOCUMENTS

JP        2002-367193       12/2002

OTHER PUBLICATIONS

Japanese Office Action dated Jan. 8, 2008, with partial translation, from the corresponding Japanese Application.

* cited by examiner

*Primary Examiner*—Joseph H Feild
*Assistant Examiner*—Nicholas Lee
(74) *Attorney, Agent, or Firm*—Katten Muchin Rosenman LLP (57) ABSTRACT

One of the objects of the invention is to provide an optical disc apparatus capable of focusing on a signal surface regardless of appearance of a fake signal. The optical disc apparatus includes: an optical pickup for outputting a signal on the basis of reflection light of the optical disc, the optical pickup including an objective lens; a driving section for moving the objective lens of the optical pickup relative to an optical disc surface; and a focus controlling section for carrying out a focus detecting operation by detecting a reflection signal on a signal surface of the optical disc from the output signal of the optical pickup within a predetermined range of distance between the objective lens and the optical disc surface while the objective lens is being moved relative to the optical disc surface by means of the driving section.

9 Claims, 6 Drawing Sheets

FIG.4
FOCUS DETECTING PROCESS

OPTICAL DISC APPARATUS

Japanese application 2005-209257, from which priority is claimed, is incorporated herein by reference.

BACKGROUND OF THE INVENTION

1. Field of the Invention

The present invention relates to an optical disc apparatus including a CD-ROM, a CD-R, a CD-RW drive, a DVD drive, a Blu-ray disc drive and such, and a controlling method thereof.

2. Description of the Related Art(s)

Recently, types of optical disc medium have become diversified. All optical disc media commonly have a structure of plural layers and comprise a signal surface, on an inner side of a protection layer provided on a surface side of the medium, on which a signal is recorded. On the other hand, many parameters such as the thickness of a disc medium, a distance from the surface to the signal surface, the number of signal surfaces (a DVD, for example, includes a maximum of two signal surface layers) and a wavelength of a laser beam to be used for reading information from the signal surface, are different.

Accordingly, a dedicated drive for each optical disc medium has been typically used. Users, however, should be experienced in operating the respective drives and an economic burden is heavy since the users should purchase and install a dedicated drive for each optical disc medium. This has created a need for a drive (an optical disc apparatus) capable of handling plural types of optical disc medium. For such a drive, technology has been developed that takes advantage of a difference in wavelength of a light source (a laser) used for reading in accordance with the type of an optical disc medium, with one objective lens being used for changing the number of the lens aperture by means of an optical element having a wavelength selective characteristic.

Figure 5:
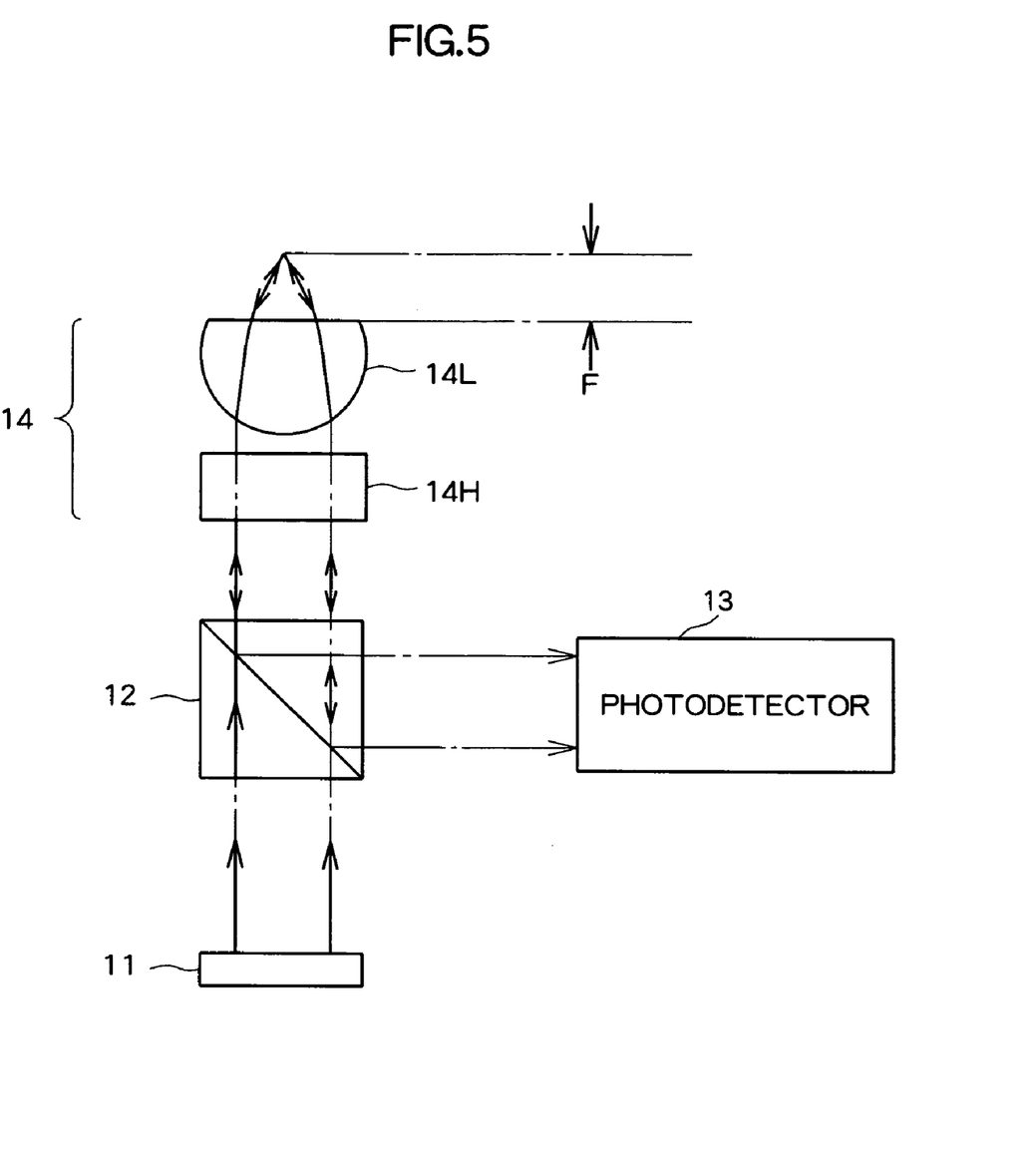
FIG. 5 schematically illustrates an example of a structure of an optical pickup.

An optical pickup for such a drive comprises a light-emitting element 11 for outputting plural wavelengths of laser beam, a beam splitter 12, a photodetector 13 and an objective lens body 14, as shown in FIG. 5. The objective lens body 14 comprises an objective lens 14L and a hologram element 14H including a diffraction grating.

The light-emitting element 11 is a semiconductor laser element for outputting three wavelengths of laser beam different from each other (a so-called three-wavelength laser), for example. In the case that the three wavelengths are arranged to correspond to a Blu-ray disc, a DVD (digital versatile disc) and a CD (compact disc), for example, control is carried out so as to output a laser beam having a wavelength of 405 nanometers for Blu-ray disc, 650 nanometers for a DVD and 780 nanometers for a CD.

The beam splitter 12 leads light outputted from the light-emitting element 11 to an objective lens body 14 side. The beam splitter 12 also leads light, which is reflected on a medium and inputted through the objective lens body 14, to a photodetector 13 side. The photodetector 13 comprises plural optical detecting elements arranged in an N×N matrix, for example. The photodetector 13 comprises a cylindrical lens, for example, for measuring a beam diameter. The light led by means of the beam splitter 12 reaches each of plural light-receiving elements through the cylindrical lens. The photodetector 13 respectively outputs signals for the strength of the light detected by the respective plural light-receiving elements.

The hologram element 14H of the objective lens body 14 refracts the laser beam, which is led through the objective lens body 14 and reflected on a medium, so that the laser beam has a numerical aperture (NA) corresponding to the wavelength thereof to lead the laser beam to the beam splitter 12. The objective lens 14L is an aspherical lens. The objective lens 14L refracts and outputs the laser beam, which is led from the light-emitting element 11 through the beam splitter 12 and the hologram element 14, so as to be focused on a point at a distance of a predetermined focal length F different for every wavelength. The objective lens 14L also concentrates the laser beam reflected on a medium to lead the laser beam to the hologram element 14H.

A signal indicating a difference in focus of the laser beam from a recording surface of an optical disc medium (a focusing error signal; an FE signal) and a signal representing the total strength of light having reached the light-receiving element (a pull-in signal; a PI signal) are generated from the signal outputted from the photodetector 13 (an RF signal). Usually, there is also a signal indicating a tracking error (a TE signal), generated from the signal outputted from the photodetector 13. Detailed description thereof will be omitted here.

Figure 6A:
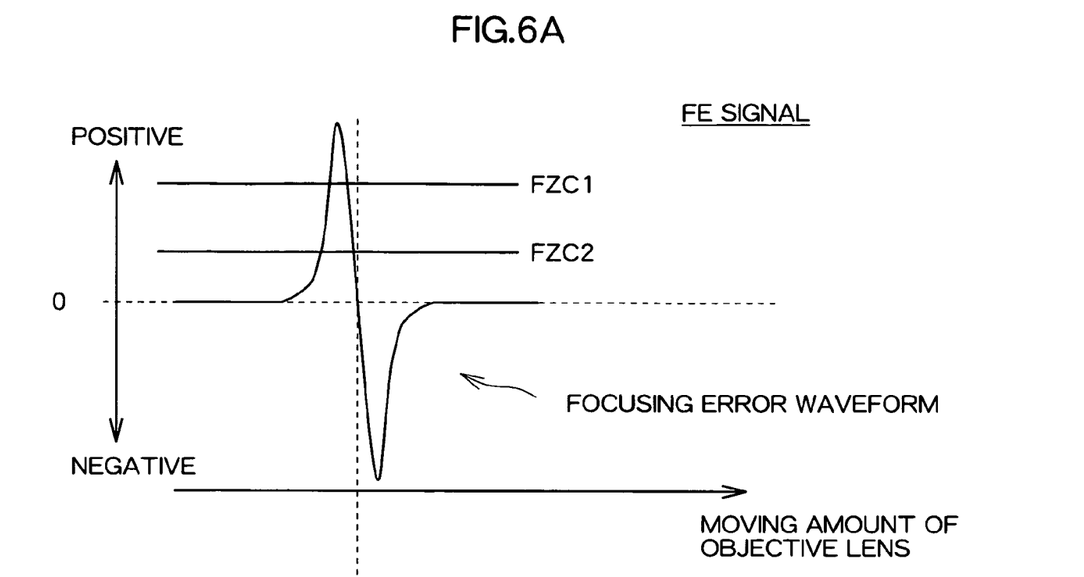
FIG. 6 schematically illustrates a focusing error signal and a pull-in signal in the vicinity of a point in focus.

The FE signal is a signal such as a signal shown in FIG. 6A. That is, the FE signal is substantially "0" in an in-focus condition. The FE signal has positive and negative peaks, respectively, when the objective lens body 14 is at a predetermined distance from an in-focus point in the case of varying a distance between the optical disc medium and the objective lens body 14 with the in-focus point being the center. The wavelength of the signal is referred to as a focusing error wavelength, hereinafter.

Figure 6B:
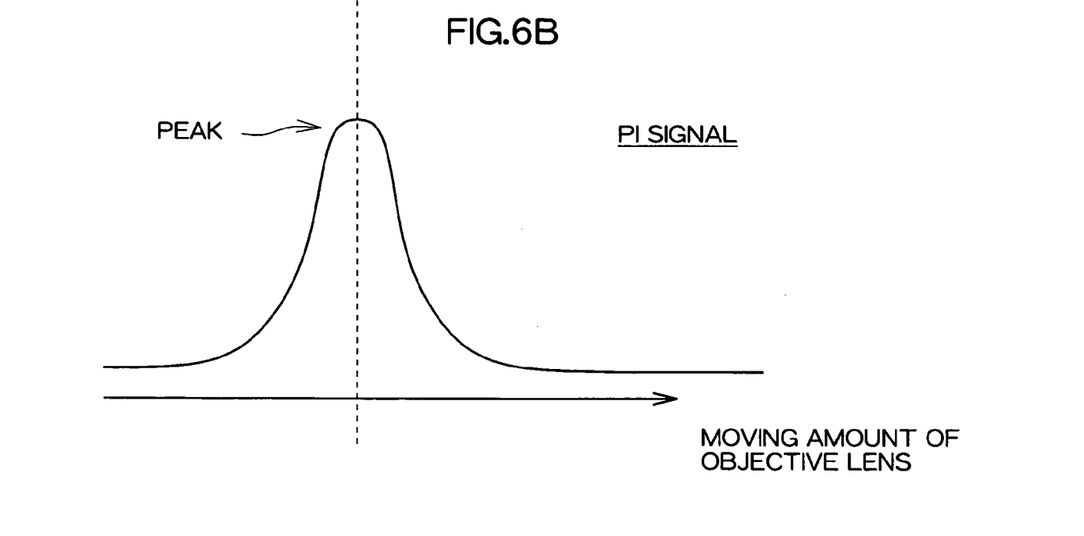

The PI signal is a signal such as a signal shown in FIG. 6B. That is to say, the PI signal has a peak at the in-focus point. FIGS. 6A and 6B schematically illustrate the FE signal and the PI signal, respectively.

Using the optical pickup to control a distance between the objective lens body 14 and a surface of a medium so that a distance from the objective lens 14L to the signal surface inside the medium becomes the focal length F, namely, so that focusing on the signal surface is possible, allows signals to be read out corresponding to plural optical disc media. The FE signal and/or the PI signal are/is used for judging whether the condition is in focus or not. For example, it is judged to be in focus when an absolute value of the FE signal becomes lower than a predetermined threshold value (approaches "0") after surpassing the peak. It is also judged to be in focus when the PI signal exceeds a predetermined threshold value.

JP-A-2002-269770 (which corresponds to US2002/136103) discloses a technology for appropriately controlling an arrangement relationship between an objective lens and a medium in an optical disc medium having two or more signal surface layers.

When the conventional optical pickup is used so as to correspond to a large number of optical disc media, however, unnecessary light in the objective lens body 14, which is not required in changing the numerical aperture, reflects inside the objective lens body 14 as reflection light on the surface of an optical disc medium or the signal surface before detecting reflection light on the signal surface in moving the objective lens body 14 to the optical disc medium, so that at least one fake signal (FAKE) is detected in some cases.

In accordance with the kind and/or the characteristics of an optical disc medium to be a subject, the shapes of the FE signal and the PI signal, which concern the reflection light on the signal surface, are likely to resemble those of the fake signals of the FE and PI signals to the extent that a distinction between the FE and PI signals and the fake signals is difficult. For example, in the case where a cause of Fake is reflection on the surface in a media having low reflectance (such as a CD-RW), the strength of the reflection light on the signal surface is sometimes smaller than that of Fake.

SUMMARY OF THE INVENTION

In view of the above, one of the objects of the invention is to provide an optical disc apparatus capable of focusing on the signal surface even in the presence of a fake signal.

In order to solve the conventional problem, the invention is an optical disc apparatus comprising: an optical pickup for outputting a signal on the basis of reflection light of the optical disc, the optical pickup including an objective lens; a driving section for moving the objective lens of the optical pickup relative to an optical disc surface; and a focus controlling section for carrying out a focus detecting operation by detecting a reflection signal on a signal surface of the optical disc from the output signal of the optical pickup within a predetermined range of distance between the objective lens and the optical disc surface while the objective lens is being moved relative to the optical disc surface by means of the driving section.

DESCRIPTION OF THE PREFERRED EMBODIMENT

Figure 1:
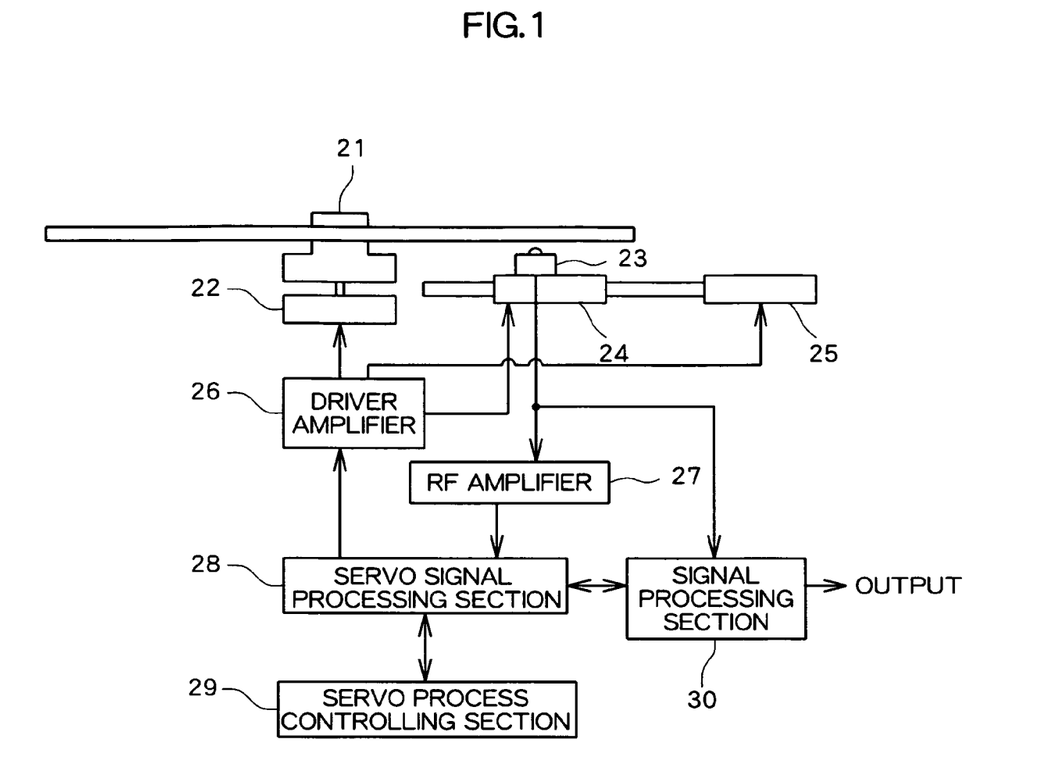
FIG. 1 is a block diagram of an example of a structure of an optical disc apparatus in accordance with an embodiment of the invention.

Embodiments of the invention will be described with reference to the drawings. An optical disc apparatus in accordance with an embodiment comprises a medium holding section 21, a spindle motor 22, an optical pickup 23, a biaxial actuator 24, a feeding motor 25, a driver amplifier 26, an RF amplifier 27, a servo signal processing section 28, a servo process controlling section 29 and a signal processing section 30, as shown in FIG. 1.

The medium holding section 21 rotatably holds the optical disc medium. The medium holding section 21 also rotates the optical disc medium with power transmitted from the spindle motor 22. The optical pickup 23 is similar to the optical pickup shown in FIG. 5, being provided with a single objective lens, and three or more lasers capable of emitting light of mutually different wavelength, and configured so as to selectively emit laser of each wavelength corresponding, for example, to a Blu-ray disc, DVD or CD. Also, the optical pickup 23 here is movable in two directions (biaxially) of a radius direction of the optical disc medium and a direction perpendicular to a surface of the optical disc medium by means of the biaxial actuator 24.

The biaxial actuator 24 is driven by means of the feeding motor 25. The biaxial actuator 24 comprises an actuator for moving the optical pickup 23 in a direction perpendicular to the surface of the optical disc medium (a focus controlling actuator). This allows a distance between the objective lens body 14 included in the optical pickup 23 and the surface of the optical disc medium to be controlled.

The driver amplifier 26 controls the driving quantity of the feeding motor 25. The driver amplifier 26 also drives the focus controlling actuator in the biaxial actuator 24 in accordance with a signal inputted from the servo signal processing section 28. The biaxial actuator 24 and the drive amplifier 26 contribute to achieve the driving section of the invention.

The RF amplifier 27 generates and outputs the FE signal and/or the PI signal on the basis of output signals of the respective plural optical detecting elements, the output signals being outputted from the optical pickup 23. The servo signal processing section 28 can be achieved with a DSP (a digital signal processor), for example. The servo signal processing section 28 detects a peak of the PI signal outputted from the RF amplifier 27 and also detects whether or not the PI signal surpasses a predetermined PI signal threshold value (FOK; Focus OK). Further, the servo signal processing section 28 carries out a predetermined process for the FE signal outputted from the RF amplifier 27, using a predetermined FE signal threshold value (FZC; focus zero cross). The predetermined process will be described later in detail. The servo signal processing section 28 outputs a result of the detection and a result of the predetermined process to the servo process controlling section 29.

Moreover, the servo signal processing section 28 outputs a signal concerning drive of a focus controlling actuator to the driver amplifier 26 in accordance with an instruction inputted from the servo process controlling section 29. The servo process controlling section 29 is a microcomputer, for example, and includes an execution module and a storage element. A program to be executed and various kinds of parameters are stored in the storage element of the servo process controlling section 29. The execution module carries out a process in accordance with the program stored in the storage element. The servo process controlling section 29 receives input of a signal inputted from the servo signal processing section 28 (a signal concerning a result of the peak detection of the PI signal or a signal of a result of the process concerning the FE signal) and performs a process for setting a distance between the optical pickup 23 and the optical disc medium so as to focus on the signal surface (a focus controlling process) on the basis of the inputted signal. The focus controlling process will be described later in detail. The servo signal processing section 28 and the servo process controlling section 29 contribute to achieve the focus controlling section of the invention.

The signal processing section 30 demodulates a signal stored in the optical disc medium on the basis of a signal outputted from the RF amplifier 27. The signal processing section 30 outputs the demodulated signal.

Now, details of a process in the servo signal processing section 28 and the servo process controlling section 29 will be concretely described. In the embodiment, the servo process controlling section 29 controls the optical pickup 23 to relatively move so as to approach a surface of the optical disc medium (a disc surface) at a fixed speed from a point, where the focal point of the light emitted from the optical pickup 23 is closer to the objective lens 14 than the surface of the optical disc medium, as the starting point (referred to as an initial point, hereinafter), and then, controls the optical pickup 23 to stop moving at a point in focus on the signal surface.

That is to say, the servo process controlling section 29 first outputs an instruction to move the optical pickup 23 to the initial point to the servo signal processing section 28. The servo signal processing section 28 outputs a signal concerning drive of the focus controlling actuator to the driver amplifier 26 in accordance with the instruction to move the optical pickup 23 to the initial point.

The servo process controlling section 29 then gives the servo signal processing section 28 an instruction to move the optical pickup 23 to the disc surface at a substantially fixed speed. The servo signal processing section 28 outputs a signal concerning drive of the focus controlling actuator to the driver amplifier 26 in accordance with the instruction to start relative movement of the optical pickup 23.

Figure 2:
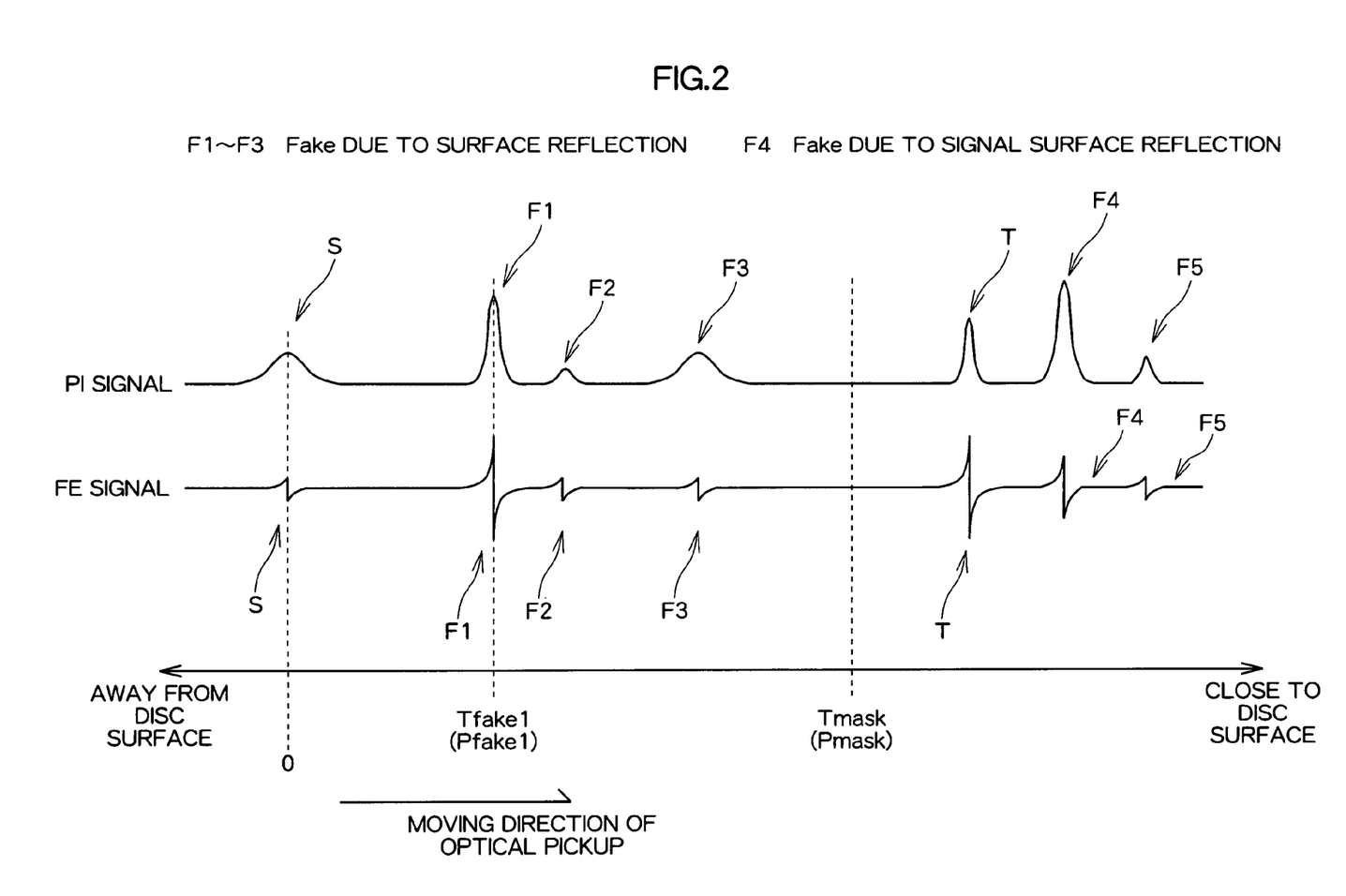
FIG. 2 illustrates an example of a signal generated on the basis of an output signal from an optical pickup in an optical disc apparatus in accordance with an embodiment of the invention.

The servo signal processing section 28 generates the FE signal and the PI signal on the basis of a signal outputted from the optical pickup 23. The generated signals change as the optical pickup 23 moves, as shown in FIG. 2, for example. That is to say, the light emitted from the optical pickup 23 is first focused on the surface of the optical disc medium, and is then incident on the optical pickup 23 as surface reflection light. In the surface reflection, the FE signal and the PI signal make curves with respective peaks (the surface reflection; S).

When the optical pickup 23 is further moved closer to the disc surface, plural fake signal groups (F1, F2, . . . ) appear due to surface reflection. The reflection light (T) on the signal surface appears when the optical pickup 23 is brought further closer to the disc surface.

Figure 3:
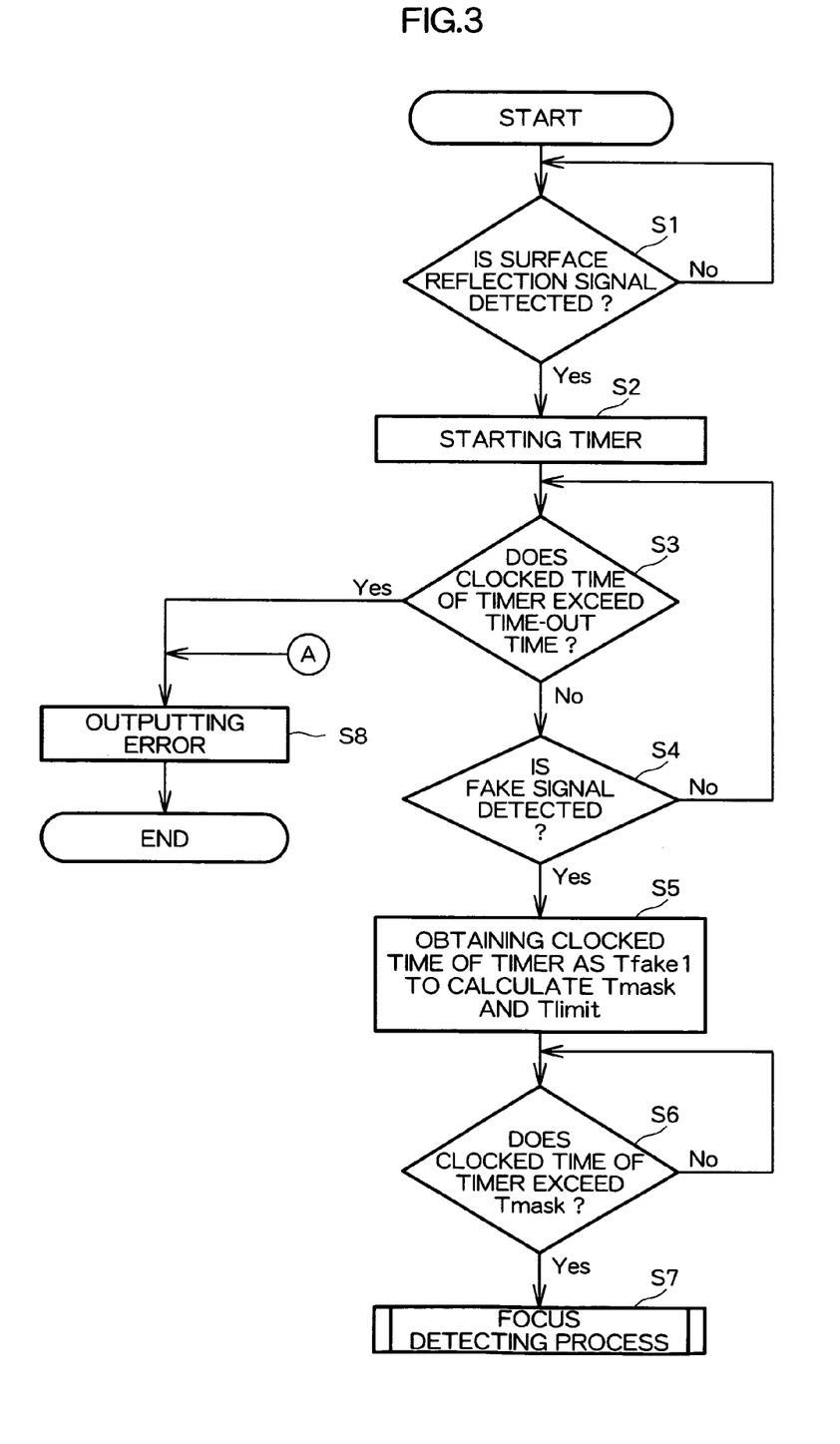
FIG. 3 is a flowchart of an example of a focus controlling process in an optical disc apparatus in accordance with an embodiment of the invention.

After giving an instruction to move the optical pickup 23 from the initial point at a substantially fixed speed, the servo process controlling section 29 starts a process shown in FIG. 3 as the focus controlling process. First, the process waits until a signal of the surface reflection (S) of at least one of the PI signal and the FE signal appears (S1). When the signal of the surface reflection is detected, the servo process controlling section 29 starts a timer, not shown (S2).

The servo process controlling section 29 checks whether or not the clocked time started in Process S2 exceeds a predetermined time-out time Tout (S3). In the case that the clocked time does not exceed the predetermined time-out time, it is checked whether or not a focusing error waveform of the FE signal or a peak of the PI signal appears (S4). Appearance of a fake signal is detected here in Process S4. The process returns to Process S3 to continue the subsequent process in the case that no fake signal is detected in Process S4. In the case of detecting a fake signal in Process S4, the clocked time of the timer is obtained as a specified fake signal, for example, information indicating a point in time of detecting the first fake signal (the fake signal detection time) Tfake1 (S5). Moreover, using information V of the moving speed of the optical pickup 23, a moving distance of the optical pickup 2 from detection of the surface reflection S to detection of the first fake signal (a fake signal detection point) Pfake1 is obtained by multiplication of the information V of the moving speed by Tfake1.

The lower and upper limits of a distance from the surface to the signal surface of the optical disc medium (the thickness of the substrate) are respectively determined on the basis of a standard. Accordingly, for every optical disc medium, the lower limit value and the upper limit value of the thickness of the substrate concerning the optical disc medium are stored in the servo process controlling section 29. The lower limit value and upper limit value of the thickness of the substrate concerning the optical disc medium are stored as a detection starting point Pmask and as a detection ending point Plimit, respectively, in accordance with wavelengths corresponding to the respective optical disc media.

For the optical disc medium in which no fake signal FAKE appears in all wavelengths, it is not necessary to store the detection starting point Pmask and the detection ending point Plimit. In this case, the servo process controlling section 29 checks whether or not fake signal FAKE appears in the kind of optical disc medium on the basis of the information of the kind of the disc which is detected in advance, and if the fake signal FAKE appears in the optical disc medium the detection starting point Pmask and the detection ending point Plimit, which are stored in connection with the detected kind of the optical disc medium, are read out in the event that Fake appears in the optical disc medium.

The servo process controlling section 29 calculates detection starting time Tmask and detection ending time Tlimit, respectively, in Process S5 as follows:

$$Tmask = Tfake1 \times Pmask/Pfake1$$

$$Tlimit = Tfake1 \times Plimit/Pfake1.$$

The value of Tout is preferably larger than Tfake1 measured in the process. Accordingly, a measured value of Tfake1 is obtained in advance on an experimental basis to set Tout at the value larger than the measured value of Tfake1, for example.

The servo process controlling section 29 waits until the clocked time of the timer exceeds Tfake1 (S6) and starts the focus detecting process when the clocked time of the timer exceeds Tmask (S7).

In the event that the clocked time of the timer exceeds predetermined Tout in Process S3, namely, in the case where it takes a time equal to or more than Tout for the fake signal to be detected, it is judged that the disc medium with no correspondence is set for the medium holding section 21, so that a signal indicating an error is outputted (S8).

With the description up to this point, detection starting time Tmask is determined using lower limit values for substrate thickness with respect to the optical disc medium, but it is also possible to more simply determine Tmask as follows:

$$Tmask = Tfake1 \times \tau$$

Here, $\tau$ is one or more parameters. Generally, when the surface of an optical disc medium is inclined with respect to the horizontal, a distance from the optical pickup 23 to the surface of the optical disc medium deviates in accordance with rotation of the optical disc medium (so-called axial runout). Therefore distance from the position where fake signal FAKE is detected to the position where the signal layer detected may deviate. Also, depending on the type of optical disc medium, a fake signal FAKE due to reflected light at the storage layer may sometimes arise at a position close to the fake signal FAKE due to surface reflection. Taking this type of situation into consideration, it is preferable to keep $\tau$ set so that Tmask is later than the period n which these fake signals FAKE are observed. For example, it is preferable to make $\tau = 1.25$.

This process allows the focus detecting process to be performed within a range of the distance between the objective lens 14L of the optical pickup 23 and the optical disc surface after moving for a time period exceeding Tmask. That is to say, when the optical pickup 23 is driven at a fixed speed V, the focus detecting operation is performed for detecting a reflection signal on the signal surface of the optical disc from the output signal of the optical pickup 23 within a range of the distance between the objective lens 14L of the optical pickup 23 and the optical disc surface, the distance being smaller than the distance from Pmask=Tmask×V to the optical disc surface.

Figure 4:
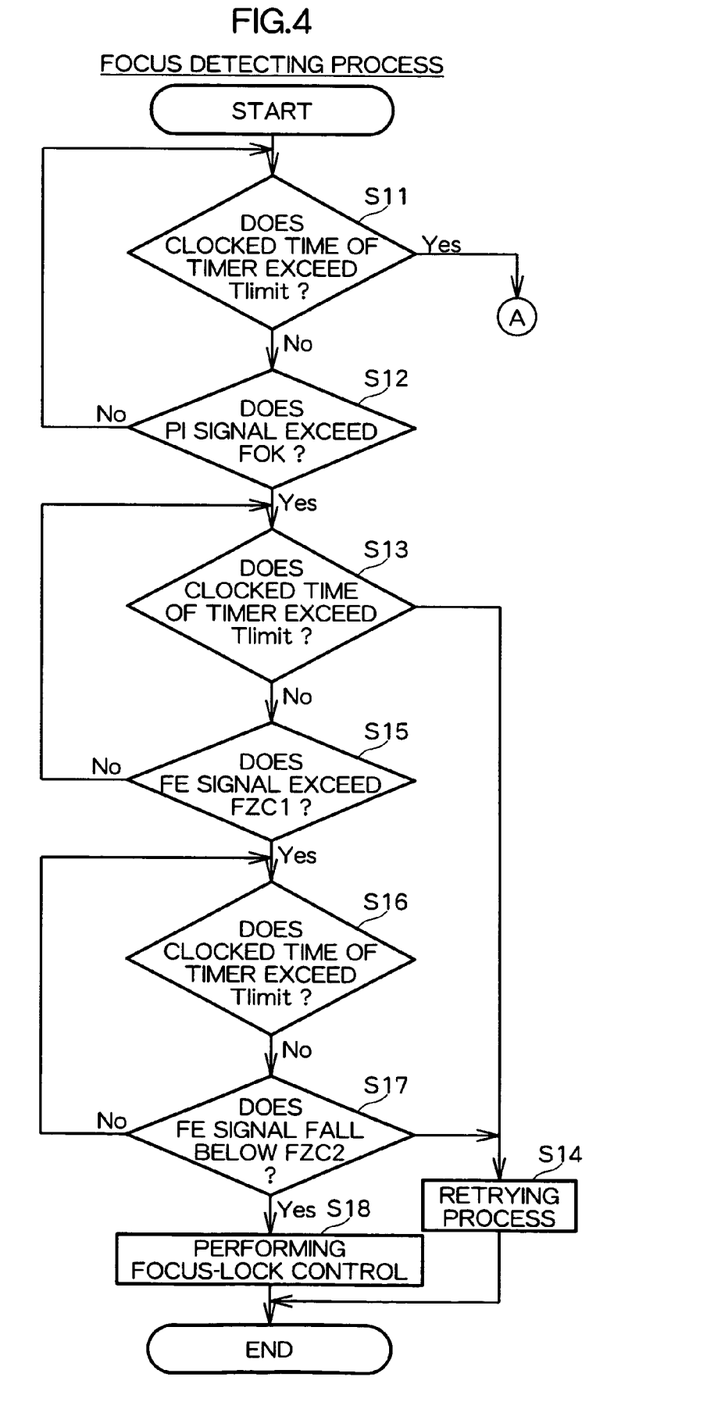
FIG. 4 is a flowchart of an example of a focus detecting process in the focus controlling process in an optical disc apparatus in accordance with an embodiment of the invention.

Now, the focus detecting process (the focus detecting operation) carried out by the servo process controlling section 29 will be described. In the process, the servo process controlling section 29 checks whether or not the clocked time of the timer exceeds Tlimit calculated in Process S5, as shown in FIG. 4 (S11). When the clocked time of the timer exceeds Tlimit calculated in Process S5, the process goes to Process S8 to judge that the disc medium with no correspondence is set for the medium holding section 21, and thereby output a signal indicating an error (A).

On the other hand, when the clocked time of the timer does not exceed Tlimit calculated in Process S5 in Process S11, it is judged whether the PI signal exceeds the predetermined threshold value FOK or not (S12). The process returns to Process S11 to continue the subsequent process in the case that the PI signal does not exceed the predetermined threshold value FOK.

When the PI signal exceeds the predetermined threshold value FOK in Process S12, the FE signal is used to perform a process for focusing on the signal surface. In the process, two threshold values FZC1 and FZC2 (FZC1>FZC2) concerning the FE signal are used. That is to say, in accordance with the focusing error waveform of the FE signal, the signal reaches a positive peak value as the objective lens approaches an in-focus point in moving in the direction approaching the disc surface, and becomes an extremely small value such as substantially "0" at the in-focus point. Accordingly, it is judged to be in focus when first exceeding the first threshold value FZC1 and then falling below the second threshold value FZC2. In the case that the threshold values FOK, FZC1 and FZC2 are different in accordance with the kind of the optical disc medium, the threshold values FOK, FZC1 and FZC2 are set for every optical disc medium. Also, when the kind of optical disc medium is detected in advance (by receiving input from a user, for example), the threshold value set in connection with the detected kind of optical disc medium is obtained for use.

That is to say, when the PI signal exceeds the predetermined threshold value FOK in Process S12, the servo process controlling section 29 further checks whether or not the clocked time of the timer exceeds Tlimit calculated in Process S5 (S13). In the case that the clocked time of the timer exceeds Tlimit calculated in Process S5, a retry process is executed (S14). The retry process will be described later.

On the other hand, in the case that the clocked time of the timer does not exceed Tlimit calculated in Process S5 in Process S13, it is checked whether or not the FE signal exceeds the first threshold value FZC1 (S15). The process returns to Process S13 to continue the subsequent process when the FE signal does not exceed the first threshold value FZC1.

When the FE signal exceeds the first threshold value FZC1 in Process S15, it is further checked whether or not the clocked time of the timer exceeds Tlimit calculated in Process S5 (S16). In the case that the clocked time of the timer exceeds Tlimit calculated in Process S5, the process goes to Process S14 to execute the retry process.

On the other hand, in the case that the clocked time of the timer does not exceed Tlimit calculated in Process S5, it is checked whether or not the FE signal falls below the second threshold value FZC2 (S17). The process returns to Process S16 to continue the subsequent process when the FE signal does not fall below the second threshold value FZC2.

On the other hand, when the FE signal falls below the second threshold value FZC2 in Process S17, it is judged to be in focus on the signal surface at that point in time, the movement in a direction vertical to the disc surface of the optical pickup 23 is stopped and an instruction to close a loop of the focusing servo (focusing servo-ON) (focus-lock control; S18) is issued.

In the retry process in Process S14, an instruction to move the optical pickup 23 to the initial point is outputted to the servo signal processing section 28 while the first and second threshold values FZC1 and FZC2 are renewed in a predetermined method to return to Process S1 for repeating the processes. A method for reducing FZC1 and FZC2 respectively by a fixed rate, for example, is used for carrying out the renewal of the threshold values. In the above description, the first and second threshold values are used. It may be possible, however, to only use the second threshold value FZC2 with a binary FE signal being "H" in the case of exceeding FZC2 and being "L" in the case of not exceeding FZC2, for example. In this case, when a falling edge of the binary FE signal is detected, it is judged to be in focus at that point in time, and an instruction to stop movement in a direction perpendicular to the disc surface of the optical pickup 23 and close a loop of the focusing servo (focusing servo-ON) (the focus-lock control) is issued.

Stopping the focus detecting operation at a point in time when a preset detection ending time has past from a predetermined reference time (a detection time of the surface reflection in the embodiment) after starting relative movement of the optical pickup 23 as in Processes S11, S13 and S16 makes it possible to reduce the likelihood of the optical pickup 23 being in contact with the optical disc medium. That is to say, this allows a focus detecting process to be carried out within a predetermined distance from Tmask×V to Tlimit×V wherein V denotes the moving speed of the optical pickup 23 in the focus direction.

Rotation of the optical disc medium may be stopped during execution of the process in FIGS. 3 and 4 (the focus controlling process).

In this embodiment, the fake signal FAKE appearing for the first time (F1) is used as a reference to control the masking time, but the invention is not limited to the above. It is possible to use fake signal FAKE F2 appearing for the second time as a reference, for example, in accordance with the characteristic of an optical system to be used. The fake signal FAKE used as a reference can be selected under a condition that it appears at a point comparatively close to the surface reflection among fakes signals Fake that can appear, and it has a comparatively large signal level and appears stably.

Further, Tfake1 is measured for every time in the above description. The parameters such as Tfake1 and Pfake1, however, typically depend on the characteristic of the optical pickup 23. Accordingly, it is possible to detect Tfake1 for every optical pickup 23 in manufacturing an optical disc apparatus, using a reference disc whose distance (D) from the surface to the signal surface is known, and to obtain Pfake1 with the time Tsignal from an in-focus condition of the surface reflection to an in-focus condition on the signal surface using the following formula:

$$P\text{fake}1 = (T\text{fake}1/T\text{signal}) \times D,$$

to store Tfake1 and Pfake1 in the servo process controlling section 29.

Moreover, the threshold value FOK concerning the PI signal and the threshold values FZC1 and FZC2 concerning the FE signal are set in advance in the embodiment. The servo process controlling section 29, however, may relatively move the optical pickup 23 with respect to the optical disc medium within a predetermined range of pre-search distance (perform a pre-search controlling process) before carrying out the focus controlling process to determine the respective threshold values on the basis of the PI signal and the FE signal, which are generated on the basis of the output signal from the optical pickup 23, during the pre-search controlling process.

In this case, the range of pre-search distance is predetermined with a point where the surface reflection is detected, for example, used as a reference. The servo process controlling section 29 may measure a peak level (the maximum value) of the PI signal and a peak level (the maximum/minimum values) of the FE signal, which are inputted during the pre-search controlling process, to determine FOK, FZC1 and FZC2 in a predetermined method based on a result of the measurement.

Concretely, a predetermined value of a ratio $\eta$ ($0<\eta<1$) for the peak level PImax of the PI signal may be used to determine the threshold value FOK as follows:

$$FOK=\eta \times PI\text{max}.$$

FZC1 and FZC2 may be similarly set by the use of the predetermined values of ratio, which correspond to FZC1 and FZC2. This allows the threshold values to be different without separately detecting the kind of inserted optical disc medium in the case that the reflectance varies in accordance with the kind of optical disc medium.

Furthermore, in the above description, the initial point of the optical pickup 23 is set at a point away from the disc surface and the optical pickup 23 is moved from the initial point toward the disc surface while the surface reflection, the fake signal and the reflection light on the signal surface are detected. Contrary to the above, however, it is also possible to set the initial point at a point closer to the disc surface than the point in focus on the signal surface, and to move the optical pickup 23 from the initial point in a direction away from the disc surface while the reflection light on the signal surface is detected. In this case, a fake signal appears even in the case of focusing on a point of the disc more to the inner side than the signal surface. Accordingly, the focus detecting process is performed after moving a predetermined distance (lapse of a certain time) from the start of relative movement at the initial point in order to reduce influence of the fake signal.

Moreover, when the strength F1 of the fake signal FAKE appearing for the first time is larger than the strength F2/Fn of the subsequent fake signals FAKE by a predetermined ratio or more, namely, F1>>F2/Fn, for example, the focus detecting process may be stopped until F1 is detected and started after F1 is detected.

The servo process controlling section 29 may calculate a distance Psignal from the surface to the signal surface of the optical disc medium with the clocked time of the timer Tsignal at a point in time when movement of the optical pickup 23 is stopped in Process S18 shown in FIG. 4 and the moving speed V of the optical pickup 23 using a formula $$P\text{signal}=T\text{signal}\times V$$

to output a result of the calculation. The result of the calculation may also be used in a predetermined process such that the focus controlling actuator is controlled for moving the optical pickup 23 in the focusing direction.

In addition, the servo process controlling section 29 may relatively move the optical pickup 23 with respect to the optical disc medium within a predetermined range of pre-search distance (a pre-search controlling process) before carrying out the focus controlling process to determine the values of Tmask and Tlimit on the basis of the PI signal and the FE signal, which are generated on the basis of the output signal from the optical pickup 23 during the pre-search controlling process.

That is to say, on the basis of the inputted PI signal or FE signal, concerning the PI signal, for example, suppose that the PI signal peak due to the fake signal at a point close to the signal surface is lower than the peak in the in-focus condition on the signal surface by a quantity more than a predetermined rate. In this case, during the pre-search controlling process, a time between when the surface reflection is detected and each peak value of the PI signal is detected is clocked by means of the timer, and a table is generated to record each of these times in connection with each other. Referring to the table, in order from i=1, the peak value Pki, which is the i-th entry, is compared with the peak value Pki+1, which is the i+1-th entry, to retrieve n satisfying $$Pkn+1/Pkn>\alpha,$$

wherein $\alpha$ denotes a predetermined ratio threshold value equal to or larger than 1. The servo process controlling section 29 obtains time recorded in the retrieved n-th entry as detection time of a fake signal Tfakelast just before the signal surface and obtains time recorded in the n+1-the entry as the time of focusing on the signal surface (Tsignal).

The servo process controlling section 29 determines Tmask satisfying $$T\text{signal}>T\text{mask}\geq T\text{fakelast}$$

on the basis of the obtained information. For example, Tmask can be determined in accordance with $$T\text{mask}=(T\text{signal}+T\text{fakelast})/2.$$

Further, the servo process controlling section 29 determines Tlimit so that $$T\text{limit}\geq T\text{signal}$$

is satisfied. For example, Tlimit can be determined in accordance with $$T\text{limit}=1.2\times T\text{signal}.$$

Performing the focus controlling process after obtaining in advance information indicating how the PI signal and the FE signal vary within a predetermined range of distance, as described above, allows the apparatus to handle a case where the value such as Tfake1 varies in accordance with an environmental condition (temperature or humidity), for example.

In accordance with the embodiment, detection of the in-focus condition within a range of a location where the fake signal appears allows a moving operation of the optical pickup in the focus direction not to be stopped, so that it is possible to focus on the signal surface regardless of appearance of the fake signal.

Moreover, the information such as the location where the fake signal appears may be used not only in the control for focusing but also in the measurement of the reflectance, the judgment of the kind of plural kinds of optical disc using the same wavelength of light (distinction among a CD, a CD-R and a CD-RW, for example) and the like.

While the present invention is described in terms of preferred or exemplary embodiments, it is not limited hereto.

What is claimed is:

1. An optical disc apparatus comprising:
  an optical pickup for outputting a signal on the basis of reflection light of the optical disc, the optical pickup including an objective lens;

a driving section for moving the objective lens of the optical pickup relatively to an optical disc surface; and a focus controlling section for carrying out a focus detecting operation by detecting a reflection signal on a signal surface of the optical disc from the output signal of the optical pickup within a predetermined range of distance between the objective lens and the optical disc surface while the objective lens is being moved relative to the optical disc surface by means of the driving section, wherein the driving section staffs to move the objective lens relative to the optical disc surface from a predetermined initial point at a substantially fixed speed, the focus controlling section restricts the detection of the reflection signal on the signal surface of the optical disc until a predetermined time period has passed from a predetermined reference point of time after the start of the relative movement, and detects the reflection signal on the signal surface of the optical disc after the predetermined time period has passed to perform the focus detecting operation within the predetermined range of distance, and the predetermined time period is determined based on a time period between a time when the signal due to the surface reflection on the surface of the optical disc is detected and a time when a fake signal due to the surface reflection on the surface of the optical disc is detected.

2. The optical disc apparatus according to claim 1, wherein the predetermined range of distance is at least a part of a range from the position of objective lens of optical pickup where the fake signal due to surface reflection on the optical disc is detected to the position of the surface of the optical disc.

3. The optical disc apparatus according to claim 1, wherein the focus controlling section performs a pre-search controlling operation for moving the objective lens relative to the optical disc surface within a predetermined range of pre-search distance by means of the driving section before the focus detecting operation and the predetermined range of distance is determined on the basis of the output signal of the optical pickup during the pre-search controlling operation.

4. The optical disc apparatus according to claim 1, wherein the focus controlling section performs a pre-search controlling operation for moving the objective lens relatively to the optical disc surface within a predetermined range of pre-search distance by means of the driving section before the focus detecting operation, a parameter concerning the detection of the reflection signal on the signal surface is determined on the basis of the output signal of the optical pickup during the pre-search controlling operation and the reflection signal on the signal surface of the optical disc is detected from the output signal of the optical pickup with the determined parameter within the predetermined range of distance between the objective lens and the optical disc surface in the focus detecting operation.

5. The optical disc apparatus according to claim 1, wherein the predetermined reference point of time is the point when the fake signal due to surface reflection on the optical disc is detected.

6. The optical disc apparatus according to claim 1, wherein the focus controlling section stops the focus detecting operation when a preset detection ending time has passed from the predetermined reference point of time after the start of the relative movement.

7. An optical disc apparatus, comprising:

an optical pickup for outputting a signal on the basis of reflection light of the optical disc, the optical pickup including an objective lens;

a driving section for moving the objective lens of the optical pickup relative to an optical disc surface; and a detection section for detecting a reflection signal on a signal surface of the optical disc from an output signal of the optical pickup within a predetermined range of time from a specified time while the objective lens is being moved relative to the optical disc surface by means of the driving section, wherein the driving section staffs to move the objective lens relative to the optical disc surface from a predetermined initial point at a substantially fixed speed, the detection section restricts the detection of the reflection signal on the signal surface of the optical disc until a predetermined time period has passed from a predetermined reference point of time after the staff of the relative movement, and detects the reflection signal on the signal surface of the optical disc after the predetermined time period has passed, and the predetermined time period is determined based on a time period between a time when the signal due to the surface reflection on the surface of the optical disc is detected and a time when a fake signal due to the surface reflection on the surface of the optical disc is detected.

8. The optical disc apparatus according to claim 7, wherein the predetermined range of time is between the specified time and the time set before the objective lens of optical pickup reaches to the surface of the optical disc.

9. A method of controlling an optical disc apparatus including an optical pickup for outputting a signal on the basis of reflection light of the optical disc, the optical pickup including an objective lens, and a driving section for moving the objective lens of the optical pickup relative to an optical disc surface, wherein the objective lens is moved relative to the optical disc surface by means of the driving section while a reflection signal is detected on a signal surface of the optical disc from the output signal of the optical pickup within a predetermined range of distance between the objective lens and the optical disc surface, the objective lens is moved by the driving section relative to the optical disc surface from a predetermined initial point at a substantially fixed speed, the detection of the reflection signal on the signal surface of the optical disc is restricted until a predetermined time period has passed from a predetermined reference point of time after the start of the relative movement, and detects the reflection signal on the signal surface of the optical disc after the predetermined time period has passed, the predetermined time period is determined based on a time period between a time when the signal due to the surface reflection on the surface of the optical disc is detected and a time when a fake signal due to the surface reflection on the surface of the optical disc is detected, and a result of the detection of the reflection signal on the signal surface is used for setting a distance between the objective lens and the optical disc surface.

* * * * *